US011949163B2

(12) United States Patent
Yoon et al.

(10) Patent No.: US 11,949,163 B2
(45) Date of Patent: Apr. 2, 2024

(54) CU/CO BASED METACONDUCTOR ARRAY ANTENNAS

(71) Applicant: University of Florida Research Foundation, Inc., Gainesville, FL (US)

(72) Inventors: Yong Kyu Yoon, Gainesville, FL (US); Renuka Bowrothu, Gainesville, FL (US); Haein Kim, Gainesville, FL (US); Seahee Hwangbo, Beaverton, OR (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 28 days.

(21) Appl. No.: 17/230,347

(22) Filed: Apr. 14, 2021

(65) Prior Publication Data

US 2021/0328360 A1 Oct. 21, 2021

Related U.S. Application Data

(60) Provisional application No. 63/010,938, filed on Apr. 16, 2020.

(51) Int. Cl.

*H01Q 21/06* (2006.01)
*H01Q 1/42* (2006.01)
*H01Q 9/04* (2006.01)

(52) U.S. Cl.

CPC ........... *H01Q 21/065* (2013.01); *H01Q 1/422* (2013.01); *H01Q 9/0414* (2013.01)

(58) Field of Classification Search

CPC ..... H01Q 21/065; H01Q 1/422; H01Q 9/0414
See application file for complete search history.

(56) References Cited

U.S. PATENT DOCUMENTS

2020/0169285 A1* 5/2020 Arfaei Malekzadeh . H04B 1/40

FOREIGN PATENT DOCUMENTS

CN 104134870 A * 11/2014
CN 209636124 U * 11/2019

OTHER PUBLICATIONS

Jivesh Govil. "4G Mobile Communication Systems: Turns, Trends and Transition". 2007 International Conference on Convergence Information Technology. pp. 13-18.
Sánchez et al. "Millimeter wave radio channel characterization for 5G vehicle-to-vehicle communications". Measurement, vol. 95., pp. 223-229. 2017.
Rappaport et al. "Millimeter Wave Mobile Communications for 5G Cellular: It Will Work!". IEEE Access. vol. 1, pp. 335-349. 2013.

(Continued)

*Primary Examiner* — Dieu Hien T Duong
(74) *Attorney, Agent, or Firm* — Thomas | Horstemeyer, LLP

(57) ABSTRACT

The present disclosure describes various embodiments of systems, apparatuses, and methods for implementing an array antenna having a combination of ferromagnetic and nonferromagnetic conductors in alternating multilayers. One such antenna device comprises an array of patch antennas on a substrate, wherein the patch antennas are formed of a (Continued)

combination of ferromagnetic and nonferromagnetic conductors in alternating multilayers; and a microstrip feeding line coupled to the array of patch antennas. Other systems, apparatuses, and methods are also presented.

20 Claims, 11 Drawing Sheets

(56) References Cited

OTHER PUBLICATIONS

Sato et al. "Skin effect suppression for Cu/CoZrNb multilayered inductor". Journal of Applied Physics, vol. 111, pp. 07A501-07A501-3. 2012.
Zhuang et al. "Magnetic-Multilayered Interconnects Featuring Skin Effect Suppression", IEEE Electron Device Letters. vol. 29, No. 4, pp. 319-321. Apr. 2008.
Rahimi et al. "Study on Cu/Ni Nano Superlattice Conductors for Reduced RF Loss". IEEE Microwave and Wireless Components Letters. vol. 26, No. 4, pp. 258-260. Apr. 2016.
Hwangbo et al. "Cu/Co Multilayer-Based High Signal Integrity and Low RF Loss Conductors for 5G/Millimeter Wave Applications". IEEE Transactions On Microwave Theory and Techniques. vol. 66, No. 8, pp. 3773-3780) Aug. 2018.
Rejael et al. "Suppression of skin effect in metal/ferromagnet superlattice conductors". Journal of Applied Physics. vol. 96, No. 11, pp. 6863-6868. Dec. 1, 2004.
Rahimi et al. "Cylindrical radial superlattice conductors for low loss microwave components", vol. 117. pp. 103911-103911-7. 2015.
Constantine A. Balanis. "Antenna Theory—Analysis And Design, Third Edition". Fundamental Parameters of Antennas. 1072 pages. 2005.
Singh et al. "Micro strip Patch Antenna and its Applications: a Survey". Comp. Tech. Appl. vol. 2, No. 5, pp. 1595-1599. Sep.-Oct. 2011.
Chakravarthy et al. "Comparative Study on Different Feeding Techniques of Rectangular Patch Antenna", IEEE Xplore. 6 pages. 2016.
Bisht et al. "Study The Various Feeding Techniques of Microstrip Antenna Using and Simulation Using CST Microwave Studio", International Journal of Emerging Technology and Advanced Engineering. <www.ijetae.com>. vol. 4, Issue 9, pp. 318-324. Sep. 2014.

* cited by examiner

TABLE II
COMPARISON WITH OTHER 4X4 ARRAY ANTENNAS

| Ref | Freq (GHz) | Array size | substrate; No. of layers | Gain (dBi) | BW (GHz) |
|---|---|---|---|---|---|
| [1] | 28 | 4x4 | RO5880, RO2929; Multi | 17.6 | 5 |
| [2] | 28 | 4x4 | RO5880; Single | 17 | 0.38 |
| [3] | 28 | 4x4 | N/A; Single | 19.1 | 0.1 |
| [4] | 28.5 | 4x4 | Duroid; Single | 14.82 | 0.112 |
| [5] | 28 | 4x4 | Taconic TLY; Single | 17.01 | 4.91 |
| **This work** | **31.9 Cu** | **4x4** | **Glass; Single** | **16.5** | **0.12** |
| **This work** | **31.2 Cu/Co** | **4x4** | **Glass; Single** | **22.5** | **0.3** |

References:

[1] H. Xia, T. Zhang, L. Li and F. Zheng, "A low-cost dual-polarized 28 GHz phased array antenna for 5G communications," *2018 International Workshop on Antenna Technology (iWAT)*, Nanjing, 2018, pp. 1-4.

[2] D. N. Arizaca-Cusicuna, J. Luis Arizaca-Cusicuna and M. Clemente-Arenas, "High Gain 4x4 Rectangular Patch Antenna Array at 28GHz for Future 5G Applications," *2018 IEEE XXV International Conf. on Electronics, Electrical Engineering and Computing (INTERCON)*, Lima, 2018, pp. 1-4.

[3] M. Clenet and L. Shafai, "Wideband single layer microstrip array at 28 GHz," *IEEE Antennas and Propagation Society International Symp. 1999 Digest. Held in conjunction with: USNC/URSI National Radio Science Meeting (Cat. No.99CH37010)*, Orlando, FL, 1999, pp. 2106-2109 vol.3.

[4] Beenish, T. Saraswat, M. R. Tripathy and G. Mahendru, "Design of a high gain 16 element array of microstrip patch antennas for millimeter wave applications," *2016 2nd International Conf. on Contemporary Computing and Informatics (IC3I)*, Noida, 2016, pp. 182-184.

[5] K. Kyoseung, C. Jaehoon, "A 28 GHz 4x4 U-Slot Patch Array Antenna for mm-wave Communications," *2018 International Symp. on Antenna and Propagation (ISAP 2018)*, Busan, Korea, 2018.

FIG. 11

CU/CO BASED METACONDUCTOR ARRAY ANTENNAS

CROSS-REFERENCE TO RELATED APPLICATION

This application claims priority to U.S. provisional application entitled, "Cu/Co Based Metaconductor Array Antennas," having Ser. No. 63/010,938, filed Apr. 16, 2020, which is entirely incorporated herein by reference.

STATEMENT REGARDING FEDERALLY SPONSORED RESEARCH OR DEVELOPMENT

This invention was made with government support under 1439644 awarded by the National Science Foundation. The government has certain rights in the invention.

BACKGROUND

International Telecommunications Union-Radio Communications sector (ITU-R) has implemented a certain set of rules or standards to consider for mobile communication generations. For instance, for a network to be considered as 4th generation (4G), all its Internet Protocols (IP) should be packet switching instead of circuit switching and should have a peak data rate of close to 100 Mbps on a mobile network and 1 Gbps for local wireless connection.

Future 5G targets much higher capacity, data rates (>1 Gbps), machine-machine type communications, and low latency by transitioning to a higher frequency spectra. According to the U.S. Federal Communications Commission (FCC) rules, 5G uses three bands in the frequency spectrum, i.e. sub 6 GHz, 24-38 GHz, and above 60 GHz, and possesses different challenges.

For instance, frequencies above 24 GHz experience higher attenuation in air and, thus, propagate shorter distances than sub 6 GHz requiring a significantly higher number of base stations and infrastructure. From the device performance perspective, different losses, such as conductor loss, substrate dielectric loss, and surface (or interface) irregularity loss, tend to increase as a function of frequency, thereby causing more thermal dissipation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 shows a table (Table 2) comparing performance parameters of an exemplary Cu/Co based 4×4 array antenna with other preexisting antenna designs for a 4×4 array antenna.

DETAILED DESCRIPTION

The present disclosure describes various embodiments of systems, apparatuses, and methods for implementing an array antenna having a combination of ferromagnetic and nonferromagnetic conductors in alternating multilayers.

In accordance with the present disclosure, an array antenna is a crucial component in a 5G radio frequency (RF) front end module for signal transmission and reception. However, as the number of array elements increases, the long feeding transmission lines and power dividers cause significant power losses due to RF resistance of the conductor, resulting in the reduction of the total power delivered to the radiating elements and the overall antenna radiation efficiency.

Figure 1A:
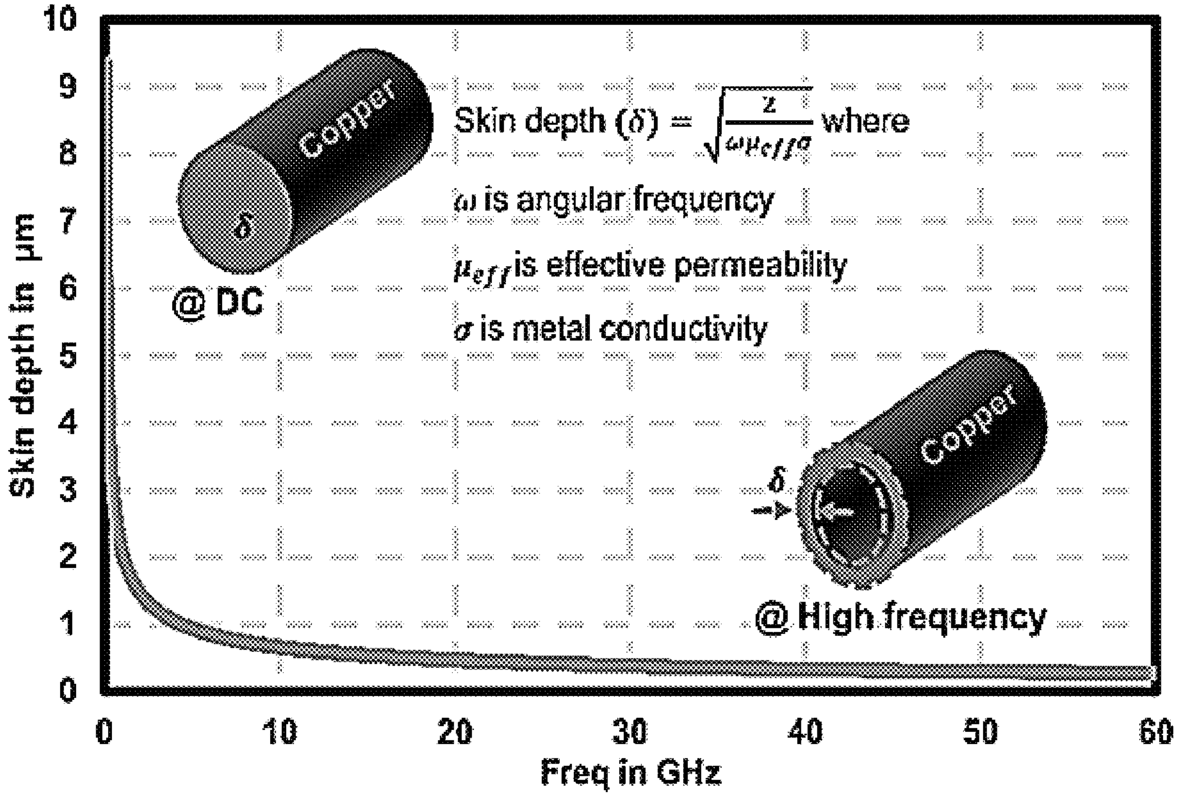
FIG. 1A shows skin depth of a copper conductor as a function of frequency in accordance with the present disclosure.

It is noted that, at DC, a current flows through the total cross section area of a conductor, as shown in the left inset of FIG. 1A. At AC, as the frequency of operation increases, the flow of current is confined only to the outermost surface of the conductor, as shown in the right inset of FIG. 1A. Here, the alternating currents (AC) produce alternating magnetic fields which in turn induce eddy currents. These eddy currents cancel out the applied currents in the center of the conductor, resulting in currents flow in the outermost portion of the conductor, which is referred to as the skin effect. The depth where the magnitude of current drops to roughly 30% of that of the conductor surface currents (e.g. $e^{-1}$) is known as the skin depth (S), and it decreases with an increase in frequency, as shown in FIG. 1A.

The skin depth (S) can be calculated using Equation (1), where ω is the angular frequency; $\mu_{eff}$ is the effective relative permeability of the conductor, and σ is the conductivity.

$$\delta = \frac{2}{\sqrt{\omega \mu_{eff} \sigma}} \quad (1)$$

Theoretically, the skin depth can be made infinite if the effective permeability of the conducting material is set to zero. Highly conductive metals like Cu, Au, Al etc., which are diamagnetic in room temperature, have positive relative permeability (i.e. $\mu_r$=~1) even in the millimeter wave bands. On the other hand, ferromagnetic materials such as Co, Ni, NiFe, CoPt, Fe, etc. are electrically less conductive while showing negative magnetic permeability between their ferromagnetic resonance (FMR) and anti-ferromagnetic resonance (AFMR) frequencies which can be calculated using the Landau-Lifshitz-Gilbert (LLG) equation.

By using the combination of ferromagnetic and nonferromagnetic conductors in alternating multilayers, the positive magnetic permeability of the nonferromagnetic layer ($\mu_N$) cancels out the real part of the negative magnetic permeability of the ferromagnetic layer ($\mu_F$), resulting in eddy current cancellation or skin effect suppression.

Figure 1B:
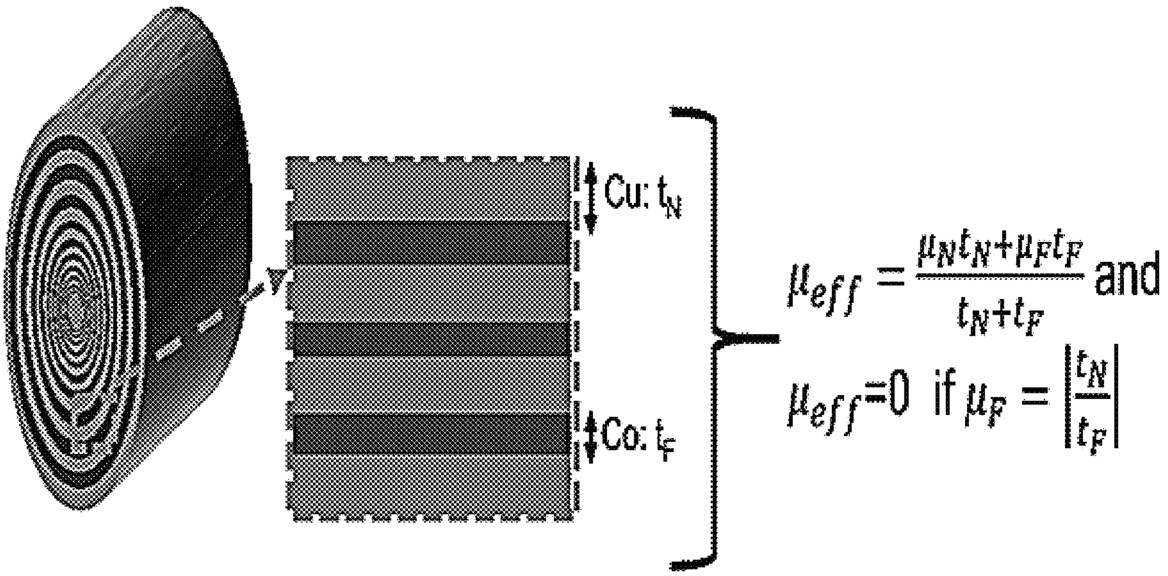
FIG. 1B shows schematics of metaconductors having nonferromagnetic and ferromagnetic (Cu/Co) superlattice metal layers and their effective magnetic permeability in accordance with various embodiments of the present disclosure.

FIG. 1B shows schematics of current distribution in a normal conductor and a metal/ferromagnetic multilayer metaconductor performed using a High Frequency Structure Simulator (HFSS, ANSYS Inc.). It can be observed, in a certain frequency range of operation, that the current inside the metaconductor is distributed more uniformly compared to the conventional solid conductor, thereby, reducing RF resistance. Due to limitations on the memory size to solve the extremely high aspect ratio multilayer structure, the array antenna can be designed using only solid Cu conductor at 28 GHz in HFSS. It is noticed that 150 nm Cu/25 nm Co achieved 50% resistance reduction at 28 GHz using Coplanar Waveguides (CPWs). Therefore, in various embodiments, Cu/Co array antennas are fabricated using the same thickness ratio and their performance is compared with solid Cu based devices.

From the device performance perspective, different losses such as conductor loss, substrate dielectric loss, and surface (or interface) irregularity (roughness) loss tend to increase as a function of frequency, thereby causing more thermal dissipation. The dielectric material loss, and the roughness associated loss can be minimized by selecting appropriate substrates with low loss tangent and minimal surface roughness. As for the conductor loss, previous works in the literature have reported different low loss conductors using magnetic and nonmagnetic multilayers at different frequencies. For example, high quality factor multilayered inductors using Cu/CoZrNb at 5 GHz have been reported. Also, a resistance reduction in 10-20 GHz has been demonstrated using Cu/NiFe and Cu/Ni. Very recently, a broadband resistance reduction in 5-32 GHz has been reported using a Cu/Co metaconductor, which is very compelling as the demonstrated frequencies cover some of the 5G frequency bands. It should be noted that previous works have used passive test structures such as coplanar waveguide (CPW) transmission lines and inductors. Performance of other RF components, such as antennas, phase shifters or filters using such multilayers, have not been previously reported. Conversely, in accordance with various embodiments of the present disclosure, a highly energy efficient array antenna, such as, but not limited to, a 4×4 array antenna, is fabricated using a Cu/Co metaconductor. In one such embodiment, a total conductor thickness is 2 μm.

For example, in an exemplary embodiment, a Cu/Co based array antenna can be fabricated using a patch antenna design. For defense and military systems which require high performance, narrow bandwidth, compactness, and easy installation with other integrated circuits (ICs), such patch antennas are highly utilized. For designing a patch antenna, each radiating patch element can be excited using different feeding techniques, where inset feeding is easy to model and implement, and the typical dielectric constant ($\in_r$) of a substrate can be between 2-12. For demonstration, a 28 GHz antenna on a glass substrate (SWG3, Corning Inc.) with a thickness t of 300 μm<<$\lambda_0$ ($\lambda_0$ is the free space wavelength), a dielectric constant $\in_r$ of 5.1, and a loss tangent (tan δ) of 0.0038 is used for design and fabrication.

Figure 2:
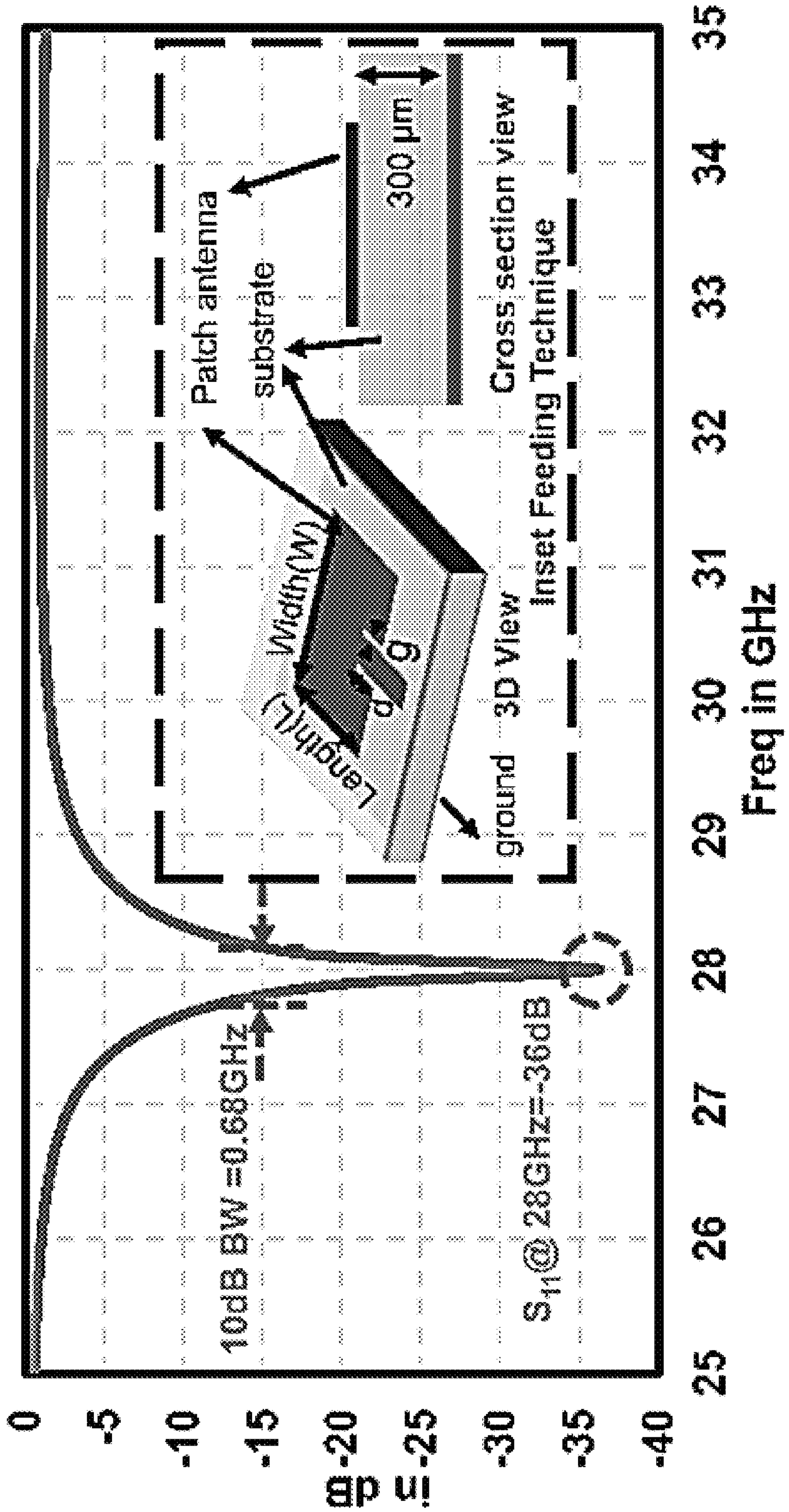
FIG. 2 shows a single patch antenna $S_{11}$ response operating at 28 GHz (W=3.07 mm, L=2.26 mm, d=0.89 mm, and g=0.07 mm) in accordance with the present disclosure.

Accordingly, FIG. 2 shows a single patch antenna $S_{11}$ response on glass operating at 28 GHz (W=3.07 mm, L=2.26 mm, d=0.89 mm, and g=0.07 mm). From FIG. 2, the width (W) sets the resonance frequency ($f_0$) of the patch, length (L) is generally chosen between $$\frac{\lambda_0}{3} < L < \frac{\lambda_0}{2},$$

and inset feeding distance (d) and gap (g) are tuned for 50Ω impedance matching at a targeted frequency. Correspondingly, the simulated gain of a single patch antenna is nearly 6 dBi and the 10-dB bandwidth is approximately 0.68 GHz.

In order to increase the gain and directivity, a 4×4 array antenna is designed and implemented, in one embodiment, in which, for equal power distribution among radiating patches, a 3 dB power divider using quarter wave transformers is designed at the target frequency, and, to reduce coupling between patches and have grating lobes suppressed, an optimal distance (p=6.8 mm) between the patches is chosen between $$\frac{\lambda}{2} < p < \lambda.$$

Figure 3:
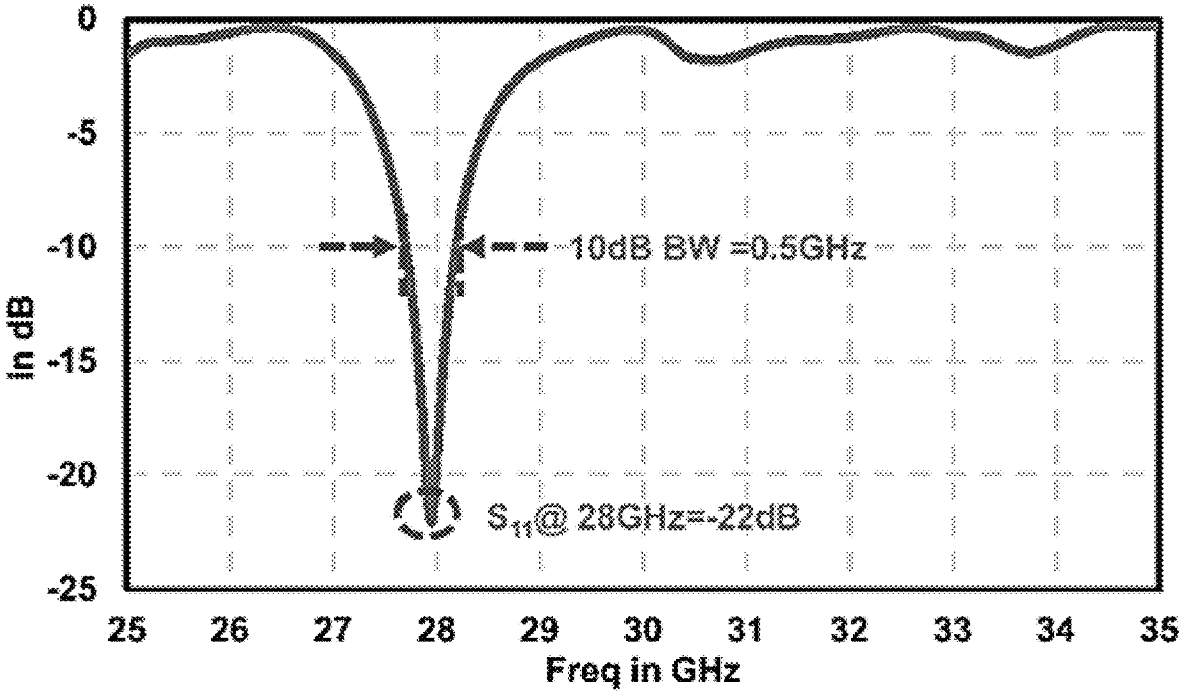
FIG. 3 shows a simulated 4×4 array antenna $S_{11}$ response operating at 28 GHz in accordance with various embodiments of the present disclosure.

Accordingly, as shown in FIG. 3, a 4×4 array antenna is designed and simulated using HFSS, where the resonance frequency is 28 GHz, the 10-dB bandwidth is equal to 0.5 GHz, the simulated gain is equal to 16.5 dBi, and the total area of the designed 4×4 array antenna is 5.61 $cm^2$.

Figure 4:
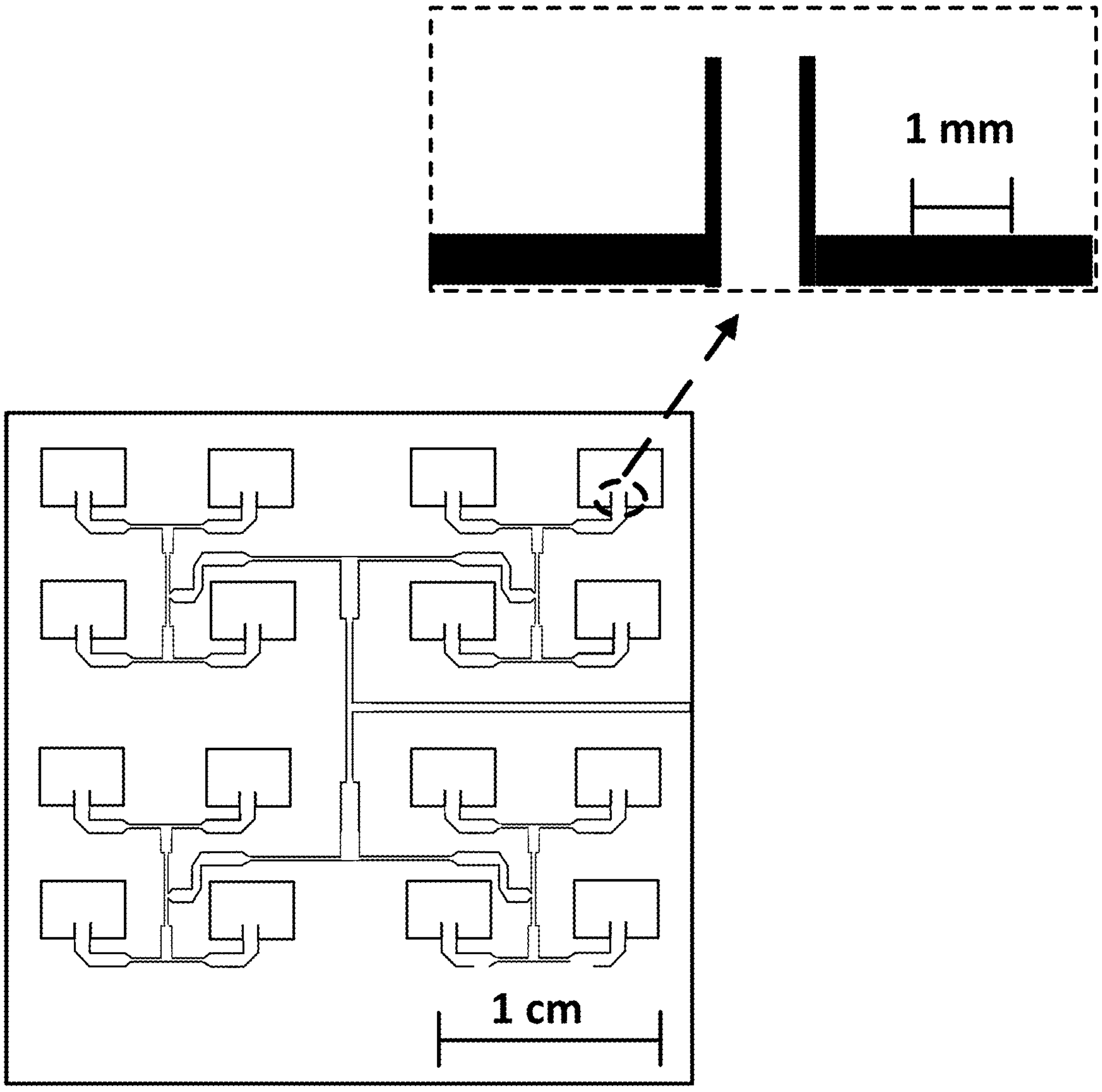
FIG. 4 shows a line drawing representation of a fabricated 4×4 array antenna on a glass substrate in accordance with various embodiments of the present disclosure.
Figure 5:
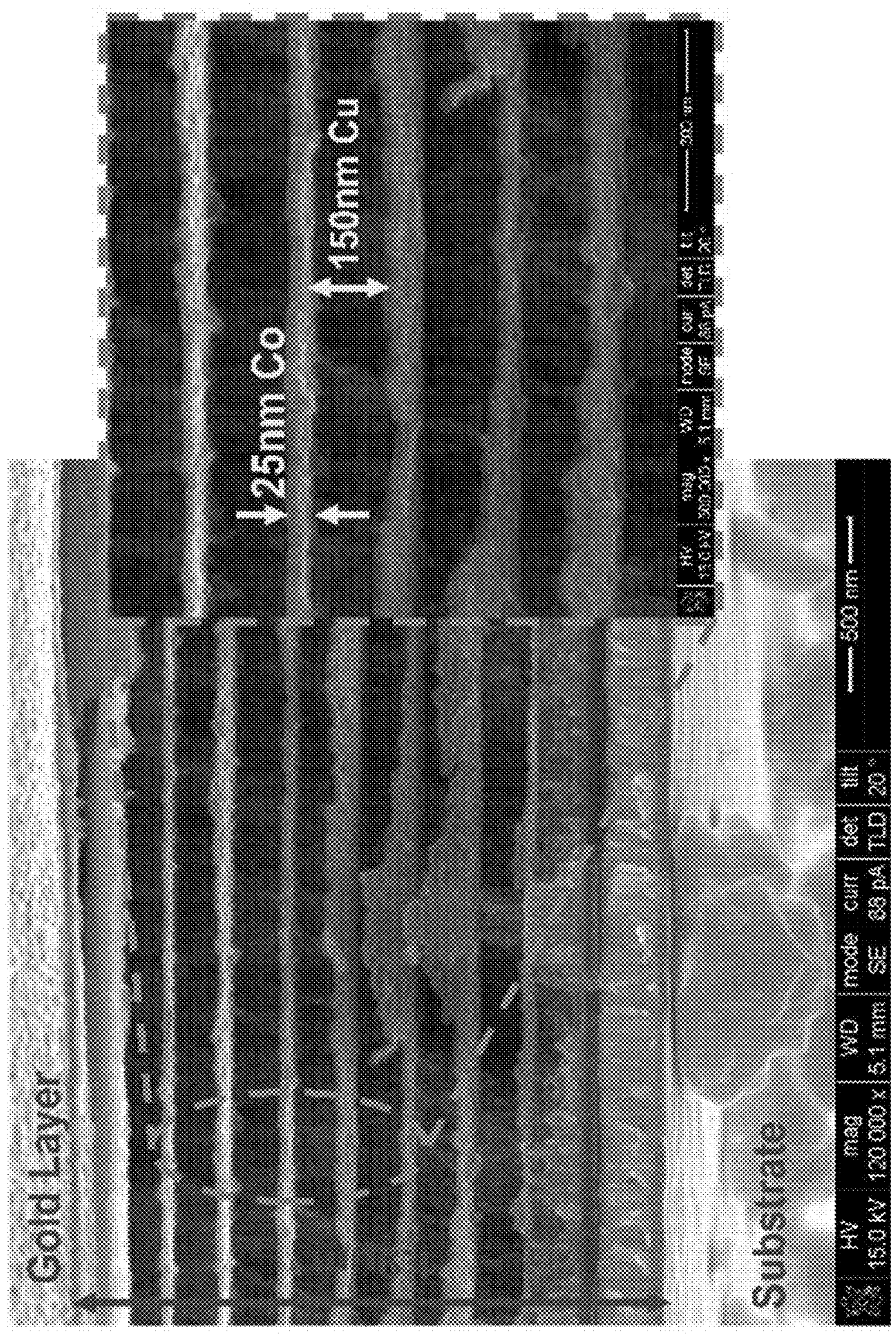
FIG. 5 shows an SEM (scanning electron microscope) cross sectional image of a fabricated Cu/Co metaconductor in accordance with various embodiments of the present disclosure.
Figure 6:
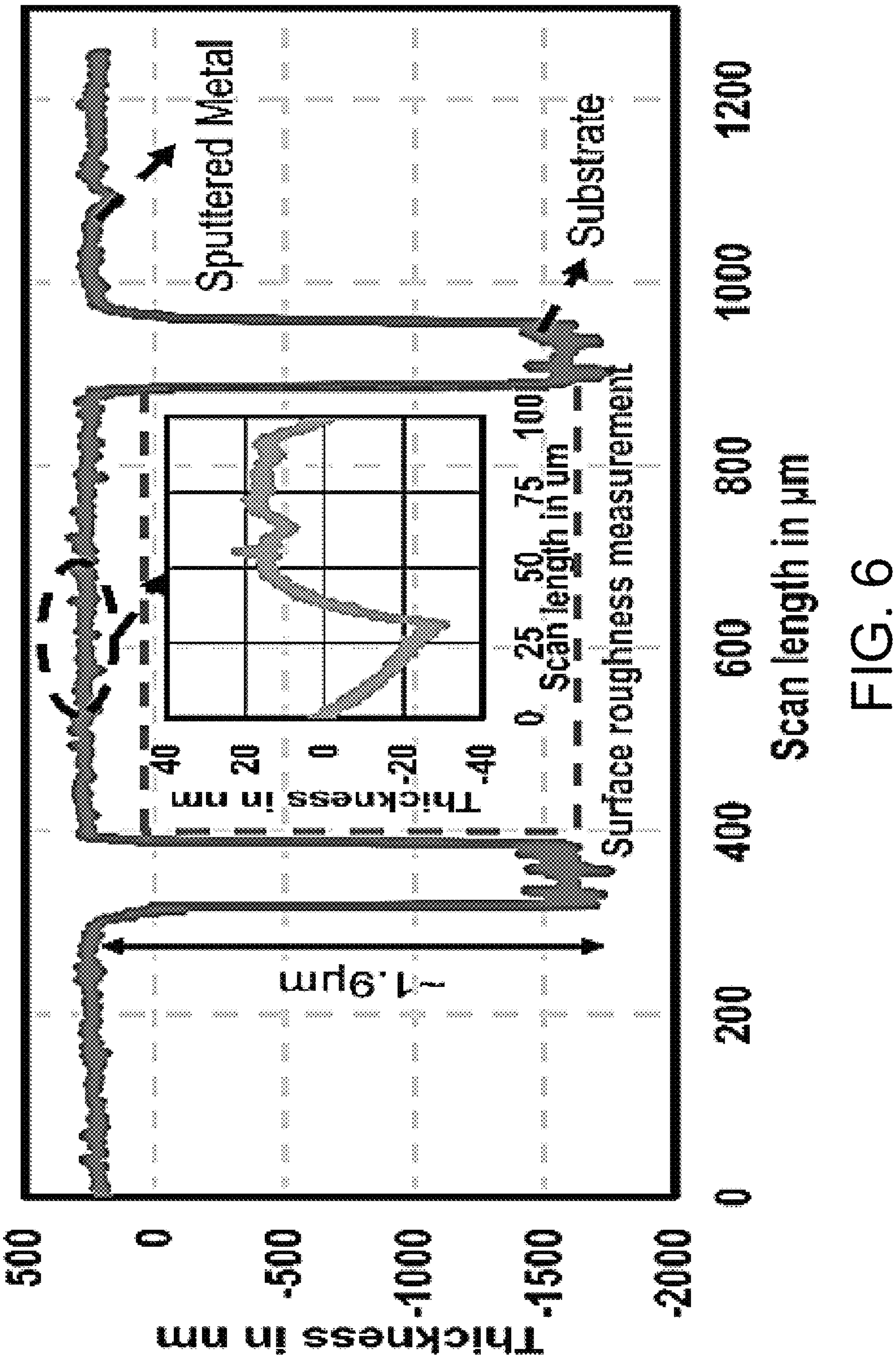
FIG. 6 shows a thickness and a roughness measurement of a sample from a fabricated 4×4 array antenna via a sputtering technique in accordance with the present disclosure.

In various embodiments, array antennas are fabricated using two different techniques on glass substrates. For example, under vacuum conditions, metal can be deposited on glass substrates using a sputtering approach. As such, comparison samples were fabricated using the sputtering approach, in which glass samples were initially cleaned using a piranha solution and patterned using negative photoresist NR-9 8000 (negative photoresist) and 30 nm thick titanium (Ti) was deposited as an adhesion promotion layer between copper and glass. In the case of a solid Cu sample, 1.85 μm thick Cu was deposited. Alternatively, in the case of Cu/Co metaconductor based antenna devices, 10 pairs of Cu (150 nm)/Co (25 nm) and 100 nm thick Cu layers were sputter deposited. Next, a 50 nm thick gold (Au) layer was used as a passivation layer for all devices to prevent oxidation. The total targeted thickness of the metal stack including the adhesion and passivation layers was equal to 1.93 μm for the top patch and the ground plane. As such, the total metal thicknesses for both solid Cu and Cu/Co based structures were kept the same. Correspondingly, a line drawing representation of an exemplary fabricated 4×4 array antenna device is shown in FIG. 4. In addition, FIG. 5 shows a scanning electron microscope (SEM) image of the cross section view of the Cu/Co metaconductor, in which the image clearly shows different layers of Cu and Co. Using an optical (Bruker Profilometer) and mechanical (Dektak 150) profilometers, the metal thickness and roughness of the sputtered samples were measured, as shown in FIG. 6, where the total thickness was measured to be nearly 1.9 μm and the average roughness of the sputtered metal was measured to be approximately 10-11 nm.

Figure 7:
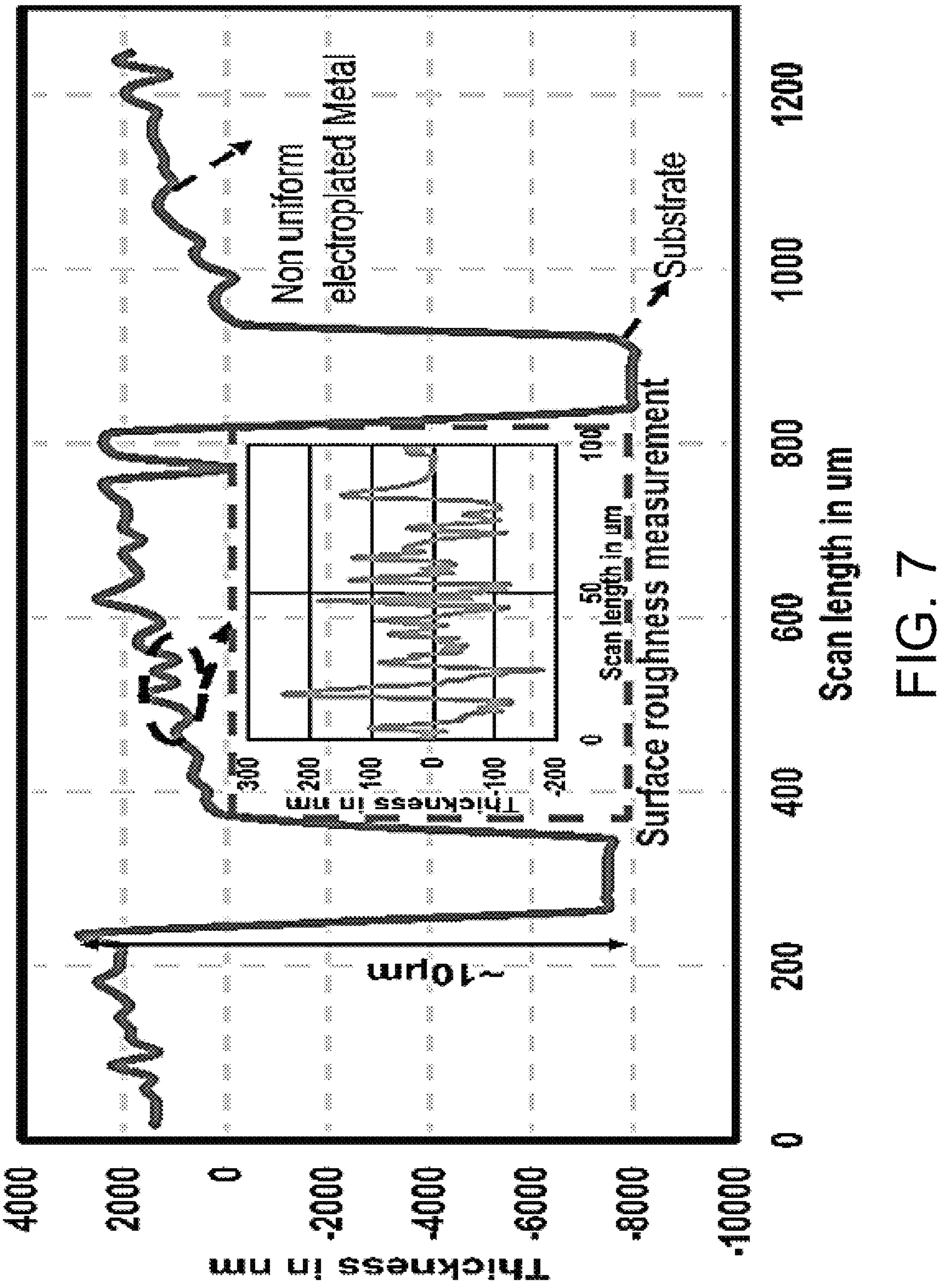
FIG. 7 shows a thickness and a roughness measurement of a sample from a fabricated 4×4 array antenna via an electroplating technique in accordance with the present disclosure.

Although vacuum based metal deposition techniques give high uniformity and smooth surface morphology, they show very low deposition rates compared to electroplating techniques. Hence, another comparison sample was fabricated using an electroplating process to deposit a thick metal layer. First, piranha cleaned samples were sputtered with seed layers, e.g., Ti (30 nm)/Cu (300 nm)/Ti (30 nm) layers and patterned using NR-98000. Before electroplating, the top Ti layer was removed using Hydrofluoric (HF) acid. At a current density of 10 mA/cm$^2$, Cu was electrodeposited for 40 minutes. Afterwards, a 50 nm thick Au layer was used as a cap layer to prevent oxidation. Due to the variation in electric fields across the sample, a non-uniformity in electroplating was observed. For the fabricated sample, the total thickness of the electroplated copper layer was measured to be approximately 10 μm and the average roughness was approximately 56-60 nm, as shown in FIG. 7. Since the measured average roughness of copper is still much lesser than the skin depth at 28 GHz (50 nm<<300 nm), the loss associated with the surface roughness will be minimal.

Figure 8:
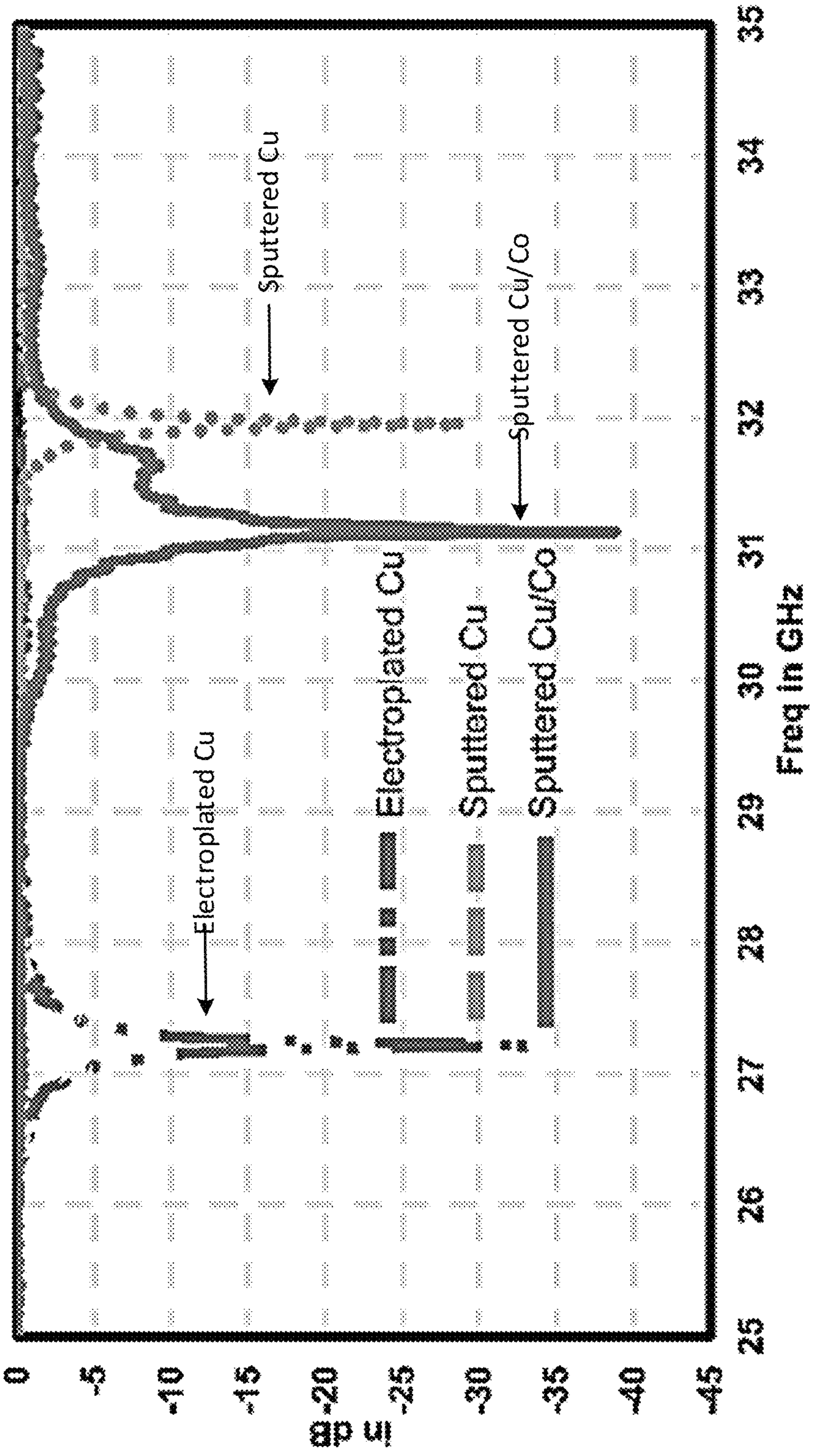
FIG. 8 shows measured resonance frequencies of fabricated array antennas for electroplated Cu, sputtered Cu, and sputtered Cu/Co samples in accordance with the present disclosure.
Figure 9:
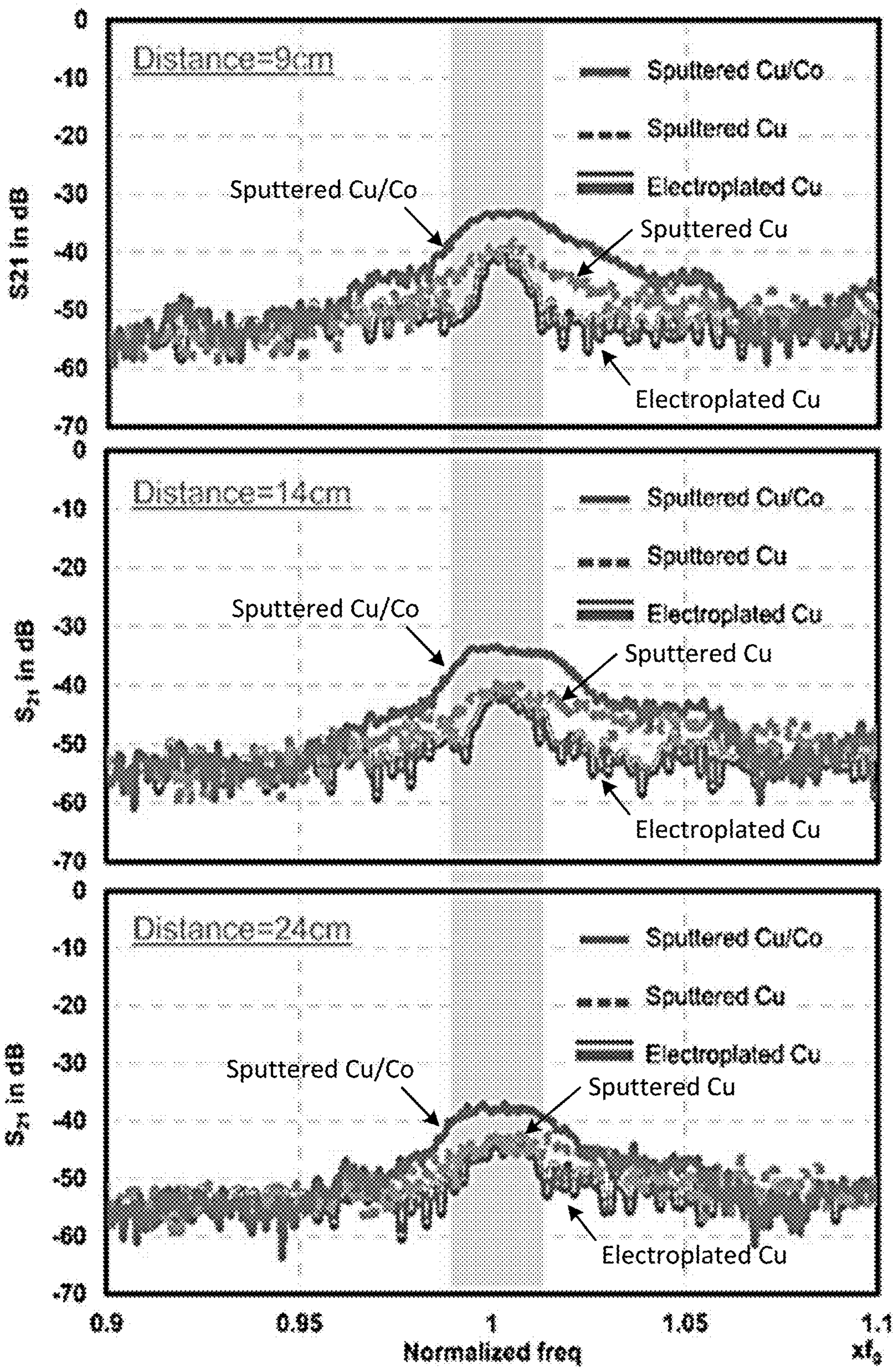
FIG. 9 shows $S_{21}$ measurements as a function of frequency with various distances for fabricated 4×4 sputtered Cu/Co, Cu, and electroplated Cu array antennas in accordance with the present disclosure.

For measurement results and analysis, the fabricated antennas were connected to 1.85 mm female end launch connectors using a soldering technique. A vector network analyzer (VNA, HP E8316A, Agilent Inc.) operating in 10 MHz-67 GHz and a calibration kit (N4694A, Agilent Inc.) was used to calibrate the tool and connectors before measurements. Single port measurements were performed to plot the resonance radiation frequencies of the array antennas, as shown in FIG. 8, and it was observed that the resonance radiation frequencies of the sputtered Cu/Co and Cu samples were 31.9 and 31.2 GHz, respectively.

Nearly 0.18 GHz improvement in bandwidth was observed in the metaconductor devices, which is analyzed further in the following discussion. These frequency shifts are mainly attributed to fabrication tolerances. On the other hand, the resonance radiation frequency of the electroplated sample was approximately 27.3 GHz. For electroplating, the lithographically patterned micromold has more than 10 μm thick pattern thickness, which is subject to higher fabrication tolerance.

Figure 10:
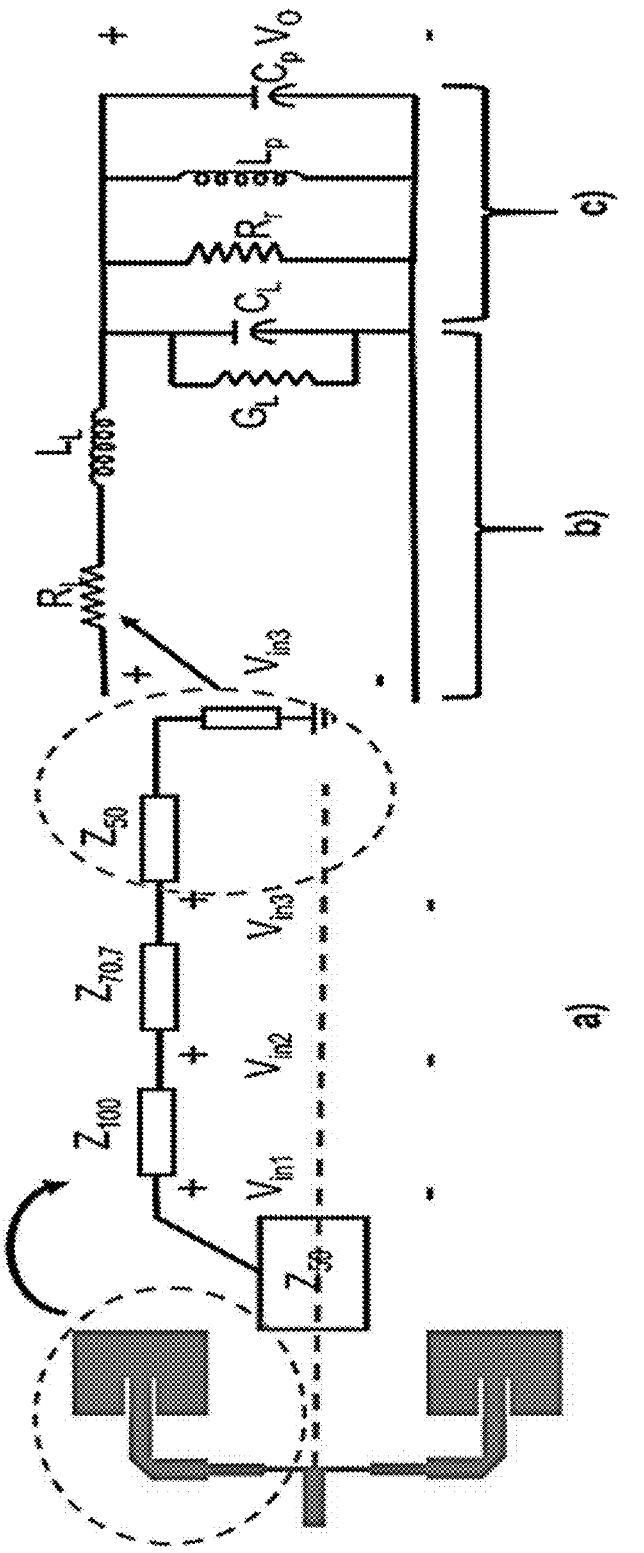
FIG. 10 shows a (a) schematic of a power divider with a patch antenna as a load, (b) an equivalent circuit of the lossy transmission line, and (c) an equivalent circuit of the patch antenna, in accordance with various embodiments of the present disclosure.

For transmission ($S_{21}$) measurements, the signal reception of the fabricated devices was measured using a horn antenna as the transmitter. Accordingly, a standard gain horn antenna operating between 26.5 GHz-40 GHz was connected to port-1 (transmitter) and the fabricated 4×4 array antennas to port-2 (receiver) of the VNA. Line of sight (LOS) measurements were performed by varying the distance between the transmitter and the receiver. In order to reduce the interference, semi anechoic conditions using high frequency absorbers surrounding the measurement setup were prepared. The distance between the horn antenna and the antenna under test (AUT) was varied from 9, 14, and 24 cm and $S_{21}$ data was collected, in which FIG. 10 shows the normalized frequency measurements of the sputtered Cu/Co, Cu, and electroplated Cu antennas at the respective distances.

From the measured data, it can be clearly seen that there is approximately 6 dB improvement in a received signal power level for the Cu/Co metaconductor based antenna compared to the solid Cu based antennas. Also, the 2 μm thick Cu/Co metaconductor antenna shows superior performance to the 10 μm thick electroplated Cu antenna. As the Cu/Co based antenna shows more than 80% savings in the usage of conductors, the Cu/Co metaconductor antenna approach is clearly advantageous not only from the material saving and cost reduction perspective but also from the reduced device weight, which can be useful for portable and space applications.

To begin an analysis of the gain performance of an exemplary Cu/Co array antenna, power received by a receiver antenna of gain $G_r$ when separated at a distance r from a transmitter antenna of gain $G_t$ is given by the Friis transmission equation (2):

$$\frac{P_r}{P_t} = S_{21}{}^2 = \frac{G_t G_r \lambda^2}{(4\pi r)^2} \tag{2}$$

where λ is the wavelength and the term $$\frac{\lambda^2}{(4\pi r)^2}$$

is also known as Path Loss (PL). For an operating frequency of the antenna, equation (2) can be written in dB scale for Cu and Cu/Co array antenna structures as:

$$S_{21/Cu}=G_{t/horn}+G_{r/Cu}+\text{PL} \tag{3}$$

$$S_{21/CuCo}=G_{t/horn}+G_{r/CuCo}+\text{PL} \tag{4}$$

For a particular distance r, PL is the same for all the fabricated devices. Therefore, subtracting equation (3) from equation (4) is equal to 6 dB from measurements, and changing back into linear scale, we have:

$$G_{r/CuCo}=4*G_{r/Cu} \tag{5}$$

The gain of an antenna is defined as efficiency times directivity. Considering the directivity as the same for both devices and we also know that the efficiency ($G_r$) of an antenna is defined as:

$$G_r=e_r e_c e_d \tag{6}$$

where $e_r$, $e_c$, $e_d$ is the reflection, conductor, and dielectric efficiency, respectively. Equation (5) in terms of equation (6) can be written as:

$$(e_r e_c e_d)_{CuCo}=4*(e_r e_c e_d)_{Cu} \tag{7}$$

Considering the reflection, dielectric (material) efficiency as the same for all the structures, equation (7) changes to $$e_{c/CuCo}=4*e_{c/Cu} \tag{8}$$

As the conductivity is proportional to the efficiency, equation (8) leads to:

$$\sigma_{c/CuCo}=4*\sigma_{c/Cu} \tag{9}$$

Therefore, from equation (9), the effective conductivity of Cu/Co at the resonance frequency is nearly four times that of Cu showing more contrasts than the one reported by S. Hwangbo, A. Rahimi and Y. Yoon, "Cu/Co Multilayer- Based High Signal Integrity and Low RF Loss Conductors for 5G/Millimeter Wave Applications," *IEEE Transactions on Microwave Theory and Techniques*, vol. 66, no. 8, pp. 3773-3780 (August 2018), which is likely due to difference in feedline architecture and fabrication process enhancement. The Hwangbo, et al. reference uses coplanar waveguides (CPW) while the architecture in this antenna feeding is a microstrip feedline type. The current distribution in CPW is mainly concentrated in the edges of the signal and ground lines while the microstrip has more uniform distribution resulting in high RF resistance reduction. The sputtering metallization process has been carefully controlled to realize low surface roughness, as shown in FIG. 8, which has contributed to further resistance reduction.

Next, FIG. 10 shows a (i) schematic of a power divider with a patch antenna as a load, (ii) an equivalent circuit of the lossy transmission line, and (iii) an equivalent circuit of the patch antenna, in accordance with various embodiments of the present disclosure. Accordingly, in various embodiments, the array antenna architecture is symmetrical comprising power dividers with patch antenna as a load, as illustrated in FIG. 10. Therefore, for bandwidth analysis, an infinitesimal transmission, a line length of $\Delta l$ is considered, where $L_L$, $C_L$, $G_L$, $R_L$ are the line inductance, capacitance, conductance, and loss resistance of the transmission line in H/m, F/m, S/m, and Ω/m, respectively. Likewise, the microstrip patch antenna can be replaced with its equivalent circuit, where $R_r$, $L_p$, $C_p$ are the input resistance, patch inductance, and capacitance, respectively. At the resonance frequency ($\omega_0$) of the patch ($1/\sqrt{L_P C_P}$), the equivalent impedance seen by the transmission line is only the $R_r$ which depends on $$\cos^2\left(\frac{\pi d}{l}\right).$$

Considering $G_L$ to be negligible, the output voltage ($V_0$) in terms of the input voltage ($V_{in3}$) can be calculated as:

$$V_o = \frac{Z_{out}}{Z_{in} + Z_{out}} V_{in3} \tag{10}$$

where $Z_{in}$ and $Z_{out}$ at the patch antenna resonance are defined as:

$$Z_{in} = R_L + j\omega L_L \tag{11}$$

$$Z_{out} = \frac{R_r}{jR_r\omega C_L + 1} \tag{12}$$

and substituting equations (11) and (12) in equation (10) results in:

$$V_o = \frac{\frac{R_r}{jR_r\omega C_L + 1}}{R_L + j\omega L_L + \frac{R_r}{jR_r\omega C_L + 1}} V_{in3} \tag{13}$$

Transfer function H(ω) for equation (13) is written as:

$$H(\omega) = \frac{V_o}{V_{in3}} = \frac{R_r}{(R_L + j\omega L_L)(jR_r\omega C_L + 1) + R_r} \tag{14}$$

The 10 dB bandwidth (BW) can be obtained by equating equation (14) to $1/\sqrt{10}$. Hence, $$|H(\omega)| = \frac{1}{\sqrt{10}} = \left|\frac{R_r}{(R_L + j\omega L_L)(R_r j\omega C_L + 1) + R_r}\right| \tag{15}$$

As $L_L$ and $C_L$ are in nH and pF, their higher order polynomials (>3) are ignored. Therefore, the bandwidth of the $4^{th}$ order polynomial in (15) is obtained as:

$$BW = \frac{1}{2L_L C_L \omega_0 R_r}\sqrt{40R_r^2 - 8R_r R_L - 2R_L^2} \tag{16}$$

As it can be observed from equation (16), the BW decreases with increase in loss resistance $R_L$ of the conductor. Also, inductance from multilayers is 10% lower than reference solid metal based structures. Therefore, improvement (0.18 GHz) in bandwidth of the narrow band array antenna is due to the lower conductor resistance of Cu/Co compared to the conventional solid copper and likely due to slight reduction of inductance.

In accordance with various embodiments of the present disclosure, a 4×4 array antenna made of superlattice multilayer Cu/Co metaconductor is provided. As discussed, its antenna performance was compared with that of two reference solid Cu antennas: one with a same thickness (2 μm) sputtered solid Cu antenna and the other with a thicker (10 μm) electroplated Cu antenna. As such, the received power by all the devices was computed as a function of distance, and an overall 6 dB improvement in signal reception was observed for the Cu/Co metaconductor based antenna compared to the reference solid Cu based antennas. Thus, using the equivalent circuits of a lossy transmission line and a patch antenna, the present disclosure verifies that Cu/Co shows an enhanced bandwidth compared to the Cu counterpart. Correspondingly, Table 1 (below) shows performance comparison among all the three antennas. From the table, a slight shift in the resonance radiation frequencies is observed, which is attributed to the fabrication tolerance. Overall, due to its low RF resistance in $K_a$ band, Cu/Co shows better transmission performance. Additionally, nearly 80% conductor weight reduction and enhanced performance is also achieved by using the 2 μm thick Cu/Co metaconductor instead of the 10 μm thick Cu.

TABLE 1

| Device | S11 @ $f_0$ (dB) | 10-dB BW (GHz) | S21 @ 9 cm (dB) | S21 @ 14 cm (dB) | S21 @ 24 cm (dB) |
|---|---|---|---|---|---|
| Sputtered Cu/Co | −38.80 | 0.30 | −33.20 | −33.80 | −36.99 |
| Sputtered Cu | −29.04 | 0.12 | −39.20 | −40.02 | −42.37 |
| Plated Cu | −33.69 | 0.14 | −39.96 | −40.70 | −43.18 |

Next, Table 2 (FIG. 11) summarizes the comparison of examples of Cu and Cu/CO array antennas (referred to as "this work" in the table) the present disclosure with previous designs of the array antenna. From the figure, compared to various 4×4 array antenna designs on both single and multilayer substrates, an exemplary Cu/Co based antenna demonstrates superior performance in terms of the gain.

In brief, the present disclosure describes various embodiments of systems, apparatuses, and methods for implementing an array antenna having a combination of ferromagnetic and nonferromagnetic conductors in alternating multilayers. In one such embodiment, a highly energy efficient 4×4 array antenna has multiple nanolayers of nonmagnetic copper (Cu) and ferromagnetic cobalt (Co), termed as a Cu/Co metaconductor, which is well-suited for 5G and millimeter wave applications. Additionally, in the present disclosure, the performance of a 10 paired Cu/Co metaconductor based array antenna, where the thickness of each metal layer is 150 nm and 25 nm, respectively, was compared with that of two reference antennas. Due to eddy current cancellation and skin effect reduction in Cu/Co metaconductor, the Cu/Co based antenna shows lower RF resistance in both feeding lines and antenna patches than reference antennas (a first reference antenna has the same total thickness but made of sputtered solid copper and the second reference antenna is made of five times thicker electroplated solid copper) in the $K_a$ band (26.5-40 GHz). Nearly a 6 dB enhancement in received signal power was also obtained for the Cu/Co based antenna compared to the reference ones, and the possibility of more than 80% conductor weight reduction without losing antenna performance is demonstrated by an exemplary Cu/Co based antenna.

As used herein, "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

The invention claimed is:

1. An antenna device comprising:

an array of patch antennas on a substrate, wherein the patch antennas are formed of a combination of a ferromagnetic conductor material at a first thickness and a nonferromagnetic conductor material at a second thickness in alternating multilayers of the ferromagnetic conductor material and the nonferromagnetic conductor material; and a microstrip feeding line coupled to the array of patch antennas.

2. The antenna device of claim 1, wherein the nonferromagnetic conductor material is Copper and the ferromagnetic conductor material is Cobalt.

3. The antenna device of claim 2, wherein the second thickness of the Copper layer is approximately 150 nm and the first thickness of the Cobalt layer is 25 nm.

4. The antenna device of claim 3, wherein each patch antenna contains at least 10 pairs of the Copper and Cobalt layers.

5. The antenna device of claim 1, wherein the array of patch antennas comprises at least a 4×4 array of the patch antennas.

6. The antenna device of claim 5, wherein a resonance radiation frequency of the patch antennas is substantially 31.9 GHz.

7. The antenna device of claim 6, wherein an operation frequency of the antenna device comprises at least 28 GHz.

8. The antenna device of claim 1, wherein the substrate is glass.

9. The antenna device of claim 1, wherein the antenna device is coupled to a 5G radio frequency (RF) front end module for signal transmission and reception.

10. The antenna device of claim 1, wherein the microstrip feeding line comprises a power divider.

11. A method of fabricating an antenna device comprising:

forming a combination of a ferromagnetic conductor material at a first thickness and a nonferromagnetic conductors material at a second thickness in alternating multilayers of the ferromagnetic conductor material and the nonferromagnetic conductor material on a substrate to form a patch antenna;

assembling a plurality of fabricated patch antennas into an array of patch antennas; and coupling a microstrip feeding line to the array of patch antennas.

12. The method of claim 11, wherein the nonferromagnetic conductor material is Copper and the ferromagnetic conductor material is Cobalt.

13. The method of claim 12, wherein the second thickness of the Copper layer is approximately 150 nm and the first thickness of the Cobalt layer is 25 nm.

14. The method of claim 13, wherein each patch antenna contains at least 10 pairs of the Copper and Cobalt layers.

15. The method of claim 11, wherein the array of patch antennas comprises at least a 4×4 array of the patch antennas.

16. The method of claim 15, wherein a resonance radiation frequency of the patch antennas is substantially 31.9 GHz.

17. The method of claim 16, wherein an operation frequency of the antenna device comprises at least 28 GHz.

18. The method of claim 11, wherein the substrate is glass.

19. The method of claim 11, wherein the microstrip feeding line is coupled to a 5G radio frequency (RF) front end module for signal transmission and reception.

20. The method of claim 11, wherein the microstrip feeding line comprises a power divider.

* * * * *